May 18, 1965  F. E. O'DONNELL ETAL  3,183,743
SHEET CUTTING MACHINE
Filed July 17, 1962  3 Sheets-Sheet 1
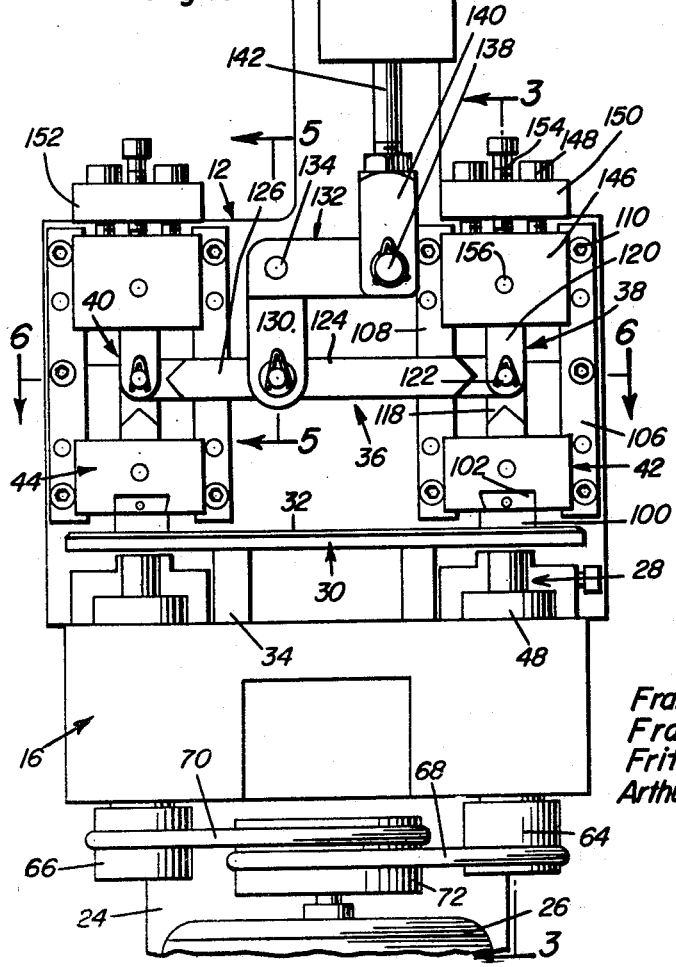
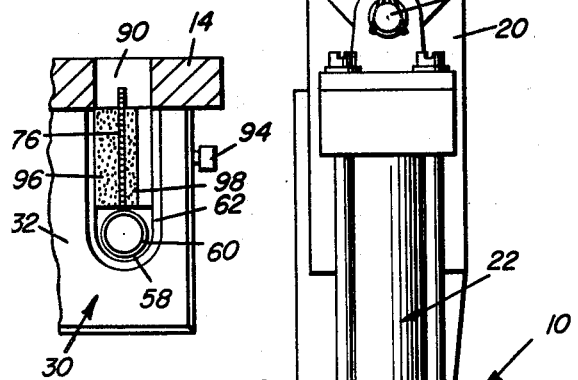
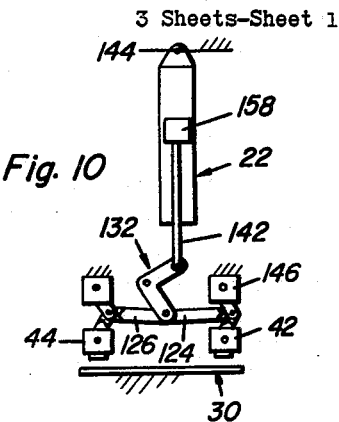
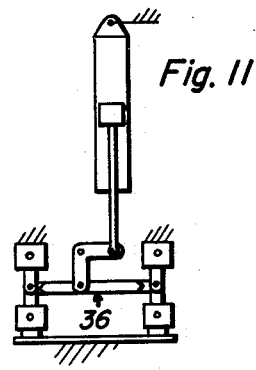
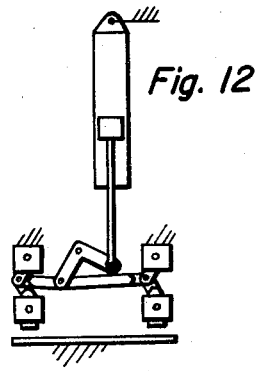
Francis E. O'Donnell
Francis B. Hallatt, Jr.
Fritz Doerscheln
Arthur J. Hallatt  INVENTORS.
BY *Clarence A. O'Brien*
*and Harvey B. Jacobson*
Attorneys

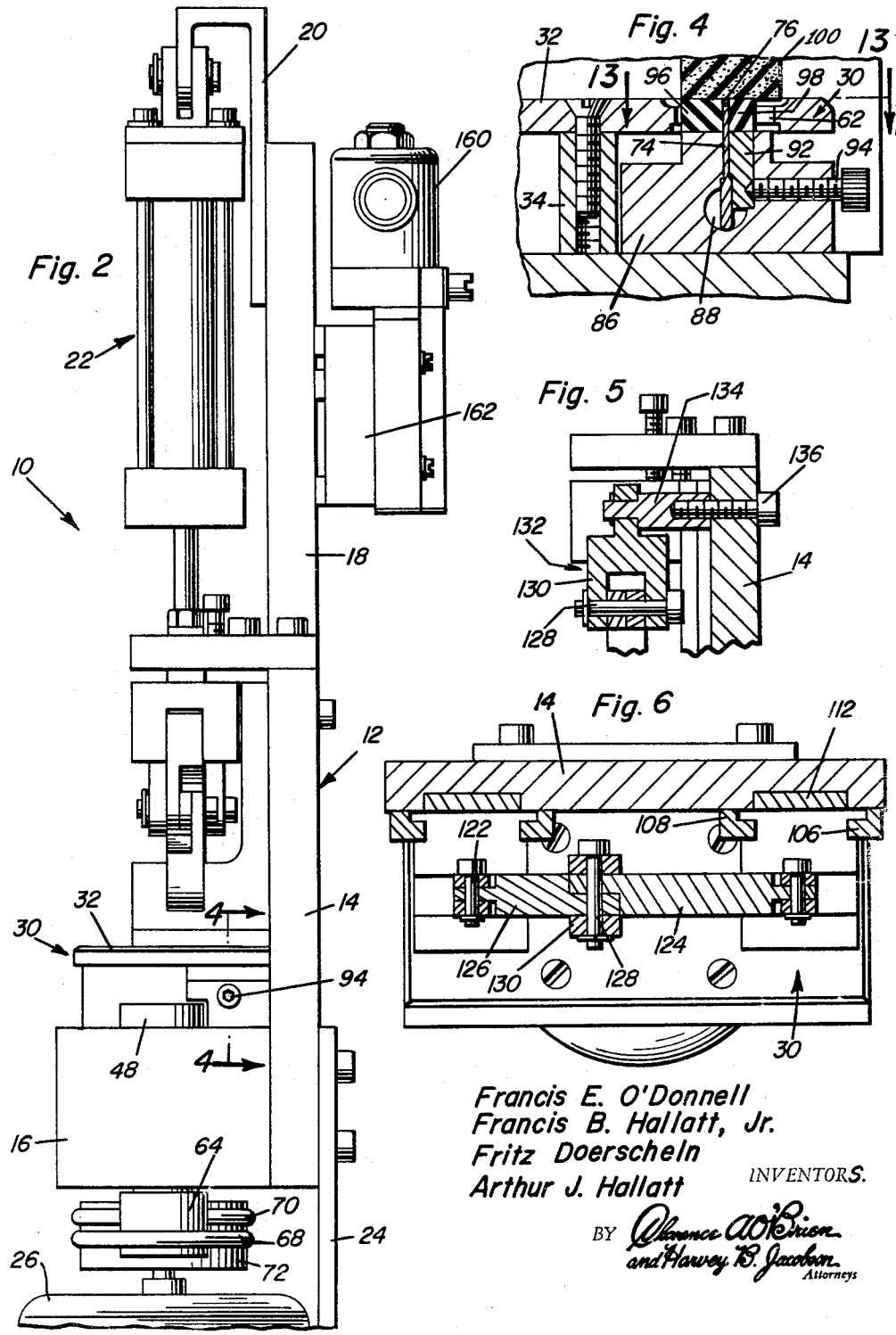

May 18, 1965   F. E. O'DONNELL ETAL   3,183,743
SHEET CUTTING MACHINE
Filed July 17, 1962                    3 Sheets-Sheet 3

Francis E. O'Donnell
Francis B. Hallatt, Jr.
Fritz Doerschein
Arthur J. Hallatt   INVENTORS.

BY Clarence A. O'Brien
and Harvey B. Jacobson
Attorneys

United States Patent Office 3,183,743
Patented May 18, 1965

3,183,743
SHEET CUTTING MACHINE
Francis E. O'Donnell, 511 Hurshbourne Road, Francis B. Hallatt, 141 Roxborough Road, Arthur J. Hallatt, Flower City Park, and Fritz Doerschein, 131 Farnsworth Road, all of Rochester, N.Y.
Filed July 17, 1962, Ser. No. 210,421
7 Claims. (Cl. 77—5)

This invention relates to a punch cutting machine for thin sheets of material and in particular, to a machine for cutting holes and perforations adjacent the edges of thin plastic material.

The punch cutting machine of the present invention is useful in connection with the manufacture of thin plastic bags made of material such as polyethylene plastic of approximately 1/1000 of an inch thick. The thin plastic sheets from which the plastic bags are made, are therefore adapted to be formed with round holes adjacent one edge of the sheet and perforations or rip slits cut between each hole and the edge prior to sealing of the plastic sheet on the sides thereof in forming the plastic bags. The machine is therefore installed at the proper location and synchronized in connection with plastic bag producing apparatus so as to place the holes and perforations at the desired location adjacent one edge of the plastic sheet from which the bags are made. In blanking or cutting the thin plastic sheet, a particular problem arises in connection with the type of material being cut for which the punch cutting machine of the present invention is well suited. It is therefore a primary object of the present invention to provide a punch cutting machine for very thin plastic material operative in accordance with the material requirements.

Another object of the present invention is to provide a sheet cutting machine which is accurately adjustable for accomplishing the required result in a rapid and economic fashion.

An additional object of the present invention in accordance with the foregoing objects, is to provide a sheet cutting machine which features a rotatable circular cutter in combination with a fixed blade cutter for forming a hole and perforations between the hole and an edge of the plastic sheet being operated upon.

A further object of the present invention in accordance with the foregoing objects is to provide a thin sheet cutting machine which features a ram device having a resilient presser pad mounted thereon for engagement with the thin plastic material above an opening in the supporting table member so as to press the material onto the cutting edges of cutters to thereby cut the material and remove any slugs resulting therefrom.

A still further object of the present invention in accordance with the foregoing objects is to provide a thin sheet cutting machine which features a removable serrated blade for cutting the perforations in the plastic sheet, the blade being mounted between elastically deformable pads on opposite sides thereof arranged to restore the plastic material to its initial position out of contact with the cutting edges after the material has been cut by pressing thereof onto the cutting edges by the presser pad on the ram device.

A further feature of the sheet cutting machine of the present invention is the provision of a power actuating mechanism for a pair of material pressing rams, the power operating mechanism including a pivotally mounted cylinder device having a piston connected by a linkage arrangement to a pair of toggle devices associated with each of the rams whereby one power stroke of the piston will impart two operating strokes to both rams simultaneously. The toggle devices are further mounted on stroke adjusting blocks adjustably spaced from the material supporting table in order to accurately define the ends of the ram stroke in order to obtain the proper amount of displacement of the thin plastic material by the presser pad mounted on the ram in alignment with openings in the supporting table into which the cutting edges of the cutters project.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of the sheet cutting machine of the present invention in an operative position with the ram at the lower end of the strokes;

FIGURE 2 is a side elevational view of the machine illustrated in FIGURE 1;

FIGURE 4 is a partial sectional view taken substantially through a plane indicated by section line 4—4 in FIGURE 2;

FIGURE 5 is a partial sectional view taken substantially through a plane indicated by section line 5—5 in FIGURE 1;

FIGURE 6 is a sectional view taken substantially through a plane indicated by section line 6—6 in FIGURE 1;

FIGURES 10, 11 and 12 are diagrammatic illustrations of the machine corresponding to the various operational phases as respectively illustrated in FIGURES 7, 1 and 8;

FIGURE 13 is a partial sectional view taken substantially through a plane indicated by section line 13—13 in FIGURE 4.

Figure 7:
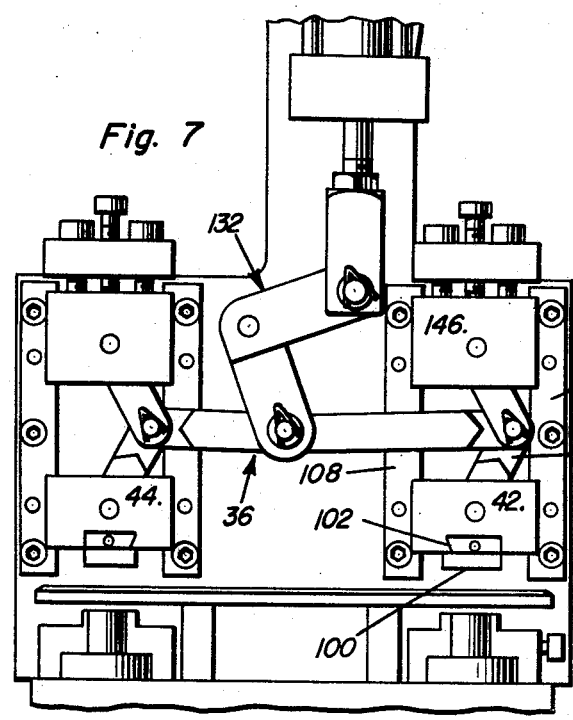
FIGURE 7 is a partial front elevational view of the machine illustrated in another operative position with the pistons at an upper end of their strokes.

Referring now to the drawings in detail, it will be observed from FIGURES 1 and 2, that the machine generally referred to by reference numeral 10 is mounted by means of a back plate member 12 at any desired location, the back plate member having a lower relatively wide portion 14 to which a spindle journaling assembly 16 is connected at a lower end. The back plate member 12 also includes a narrow upwardly projecting vertical portion 18 to which an angle bracket 20 is connected for pivotally mounting a power cylinder device generally referred to by reference numeral 22. Mounted below the back plate member 12 by means of a downwardly projecting bracket 24 secured to the back of the portion 14 of the back plate member, is a drive motor 26 adapted to impart rotational movement to a pair of rotatable cutter assemblies 28 journaled by the journaling assembly 16. Also secured to the lower portion 14 of the back plate member 12, in spaced relation above the journaling assembly 16, is a material supporting table member 30 having a fixed top surface 32 on which the thin sheet of material such as polyethylene plastic is supported with one edge abutting against the portion 14 of the back plate member. The material supporting table member 30 therefore projects forwardly from the back plate member and is disposed perpendicular thereto, being supported by a pair of spacer members 34 disposed between the bottom of the material supporting member 30 and the top of the journal assembly 16. The power operated cylinder device 22 is operatively connected by a linkage mechanism generally referred to by reference numeral 36 to a pair of toggle devices 38 and 40 disposed on adjustably mounted opposite vertical sides of the portion 14 of the back plate member, said toggle devices being operatively connected to a pair of material engaging ram devices 42 and 44 disposed above the material supporting table member 30 in alignment with the cutting edges of the rotatable cutter assemblies 28.

Figure 3:
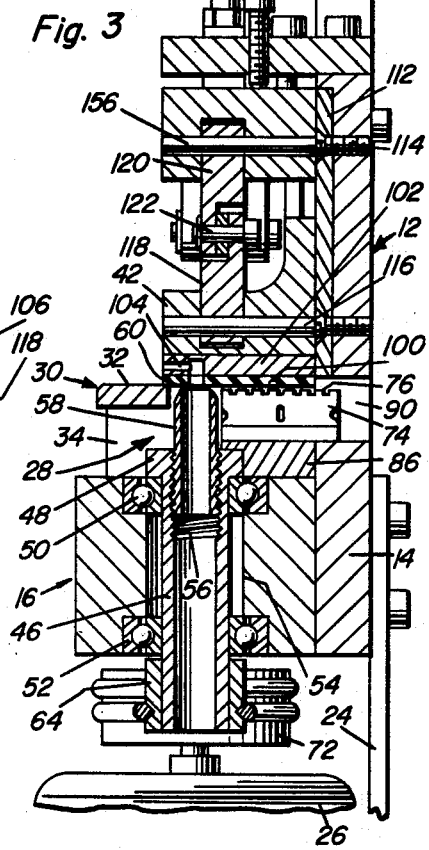
FIGURE 3 is a sectional view taken substantially through a plane indicated by section line 3—3 in FIGURE 1.

As more clearly seen in FIGURE 3, each of the rotatable cutter assemblies 28 includes a rotatable spindle member 46 having an upper flanged end portion 48 axially abutting against the top bearing assembly of a pair of spaced bearing assemblies 50 and 52 mounted within the journal assembly 16 provided with a pair of journal bores 54 through which the rotatable spindles 46 are received. The upper end portion of the rotatable spindle 46 is internally threaded at 56 for adjustable mounting of a tubular cutter 58 having externally threaded portions at the lower end and presenting an upper circular cutting edge 60 adjustably positioned slightly below the top surface 32 of the material supporting table member 30. The rotatable cutter 58 is thereby held in adjustably fixed position in an axial direction for cutting of a thin plastic sheet placed on top of the surface 32 of the table supporting member 30 and pressed into the elongated opening 62 formed in the supporting table member 30 as more clearly seen in FIGURE 13 through which the cutting edges of the cutters are exposed. In order to cut the hole in the type of material with which the present invention is concerned, it is however necessary to impart rotation to the circular cutter edges 60. Accordingly, each of the rotatable spindles 46 is respectively provided with driven pulley members 64 and 66 adjacent their lower ends as more clearly seen in FIGURE 1. Entrained about each of the pulley members 64 and 66 are flexible drive belts 68 and 70 both of which are also entrained about a double drive pulley 72 connected to the output shaft of the drive motor 26. It will therefore be apparent that the drive motor 26 when energized will impart rotation to both of the cutter spindles 46 in the same rotational direction.

Figure 9:
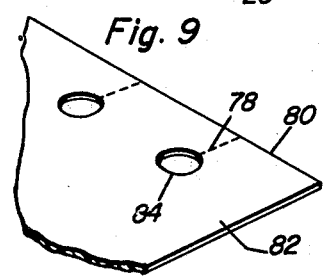
FIGURE 9 is a partial perspective view of a portion of the material after being cut by the sheet cutting machine.

Associated with each of the rotary cutter assemblies 28, is a fixedly mounted razor blade member 74 having an upper serrated cutting edge 76 adapted to cut perforations 78 from an edge 80 of a plastic sheet 82 which abuts against the back plate member, the perforations 78 connecting the edge 80 with the hole 84 cut in the sheet by a rotatable cutter assembly 28 with which each of the blade members 74 is associated; see FIGURE 9. As more clearly seen from FIGURES 3, 4 and 13, the cutting edge 76 of the razor blade 74 is radially aligned with the cutting edge 60 of its associated rotatable cutter assembly in the cutting plane. The blade 74 is held in position within a block member 86 provided with a receiving slot 88 having an enlarged lower end aligned with openings 90 in the back plate member through which the razor blade 74 may be inserted and removed for replacement. The blade members 74 are held locked in position by means of inserts 92 also received within the slot 88 in the block members 86, the inserts 92 bearing against the blade members 74 and held locked in position by means of setscrew elements 94 as more clearly seen in FIGURE 4. The top edge 76 of the blade member is thereby held at the same level with the rotatable cutting edge 60 of the rotatable cutter assembly slightly below the top surface of the material supporting table. Cemented to the blade supporting block 86 on one side of the blade member 74 and projecting thereabove to the level of the supporting table surface 32 is an elastically deformable pad 96 while on the other side of the blade member 74, a second elastically deformable pad 98 is cemented to the insert member 92. The elastically deformable pad members 96 and 98 together with the blade member 74, project upwardly through the openings 62 in the material supporting table. The pad members 96 and 98 are operative to clamp the sheet material during cutting and displace the sheet material 82 out of contact with the cutting edges 76 and 60 after it has been cut.

In order to press the sheet material onto the cutting edges 60 and 76, a resilient presser pad 100 made of rubber or similar material is cemented to a steel jib or insert 102 received within the lower end of each of the rams 32 and 44 in alignment with the openings 62 in the material supporting table 30. It will therefore be apparent that when the rams 42 and 44 reach the ends of their properly adjusted stroke, the presser pad 100 mounted thereon will displace the sheet material slightly through the openings 62 in the supporting table member 30 so as to bring the material into engagement with the cutting edges 60 and 76 in order to form the holes 84 and perforations 78 as indicated with respect to FIGURE 9. Upon retraction of the rams 42 and 44 out of engagement with the material, the elastically deformable pads 96 and 98 which clamp the sheet material to the pad 100 during cutting will then upwardly displace the material out of contact with the cutting edges. The plug cut by the circular cutting edge 60 will accordingly be removed through the hollow drive spindle 46 of the rotatable cutter assembly. A passage 104 may therefore be formed within the insert 102 and the presser pad 100 by means of which pressurized air may be introduced for ejecting plugs that may become lodged within the tubular cutter blade 58 of the rotatable cutter assembly 28, as seen in FIGURE 3. It will therefore be appreciated from the foregoing that accurate adjustment of the ram stroke is essential for achieving proper cutting of the sheet material.

Each of the rams 42 and 44 is slidably mounted by track forming elements 106 and 108 secured by fasteners 110 to the back plate portion 14. Also, as more clearly seen in FIGURES 3 and 6, a recess is formed in the back plate portion 14 for receiving slide bearing members 112 secured by fasteners 114 to the back plate member portion 14. The ram members 42 and 44 are also provided with a pivot shaft 116 to which the lower links 118 of the toggle devices are pivotally connected. The upper links 120 of each of the toggle devices 38 and 40 are pivotally connected by means of the pivot pins 122, to the lower links 118 and also to horizontal link members 124 and 126 of the linkage mechanism 36. Each of the link members 124 and 126 associated with the toggle devices 38 and 40 is therefore pivotally interconnected by means of the connecting pivot pin 128 with the lower clevis end 130 of an L-shaped lever arm 132. The lever arm 132 is pivotally mounted about a fixed axis by means of a fulcrum pin 134 secured to the back plate member portion 14 by the fastener 136 as more clearly seen in FIGURE 5. The upper free end of the lever arm 132 is pivotally connected by the pin 138 to the lower clevis end 140 of the piston rod 142 which projects from the power operated cylinder device 22. The cylinder device 22 is in turn pivotally mounted by means of the angle bracket 20 and a swivel pin 144 adjacent an upper end thereof. It will become apparent that reciprocation of the piston rod 142 angularly displacing the lever arm 132, will impart lateral displacement to the link members 124 and 126 so as to apply a lateral displacing force to the toggle pins 122 of the toggle devices 38 and 40. Inasmuch as the upper link members 120 of the toggle devices are pivotally mounted in adjustably fixed relation on the back plate member, a predetermined stroke will be imparted to the ram members 42 and 44. Accordingly, each of the toggle devices 38 and 40 has associated therewith an adjusting block member 146 slidably mounted in adjustable position between the track members 106 and 108 adjacent upper ends thereof. Accordingly, a pair of lock screw members 148 threadedly engage an upper end of the adjusting block members 146 and extend through a top spacer member 150 and 152 secured to the top edge of the back plate portion 14 on opposite sides of the vertical elongated portion 18. An adjustable screw member 154 is disposed between the lock screw members 148 in threaded engagement with the spacing members 150 and 152 for adjustable abutting engagement with the adjusting block members 146. It will therefore be apparent that the adjusting block members may be accurately positioned so as to properly locate the pivot mounting pin 156 by means of which the upper link members 120 of the toggle devices are pivotally supported in adjustably spaced relation from the material supporting table 30 so as to predetermine the stroke of the ram members 42 and 44.

Figure 8:
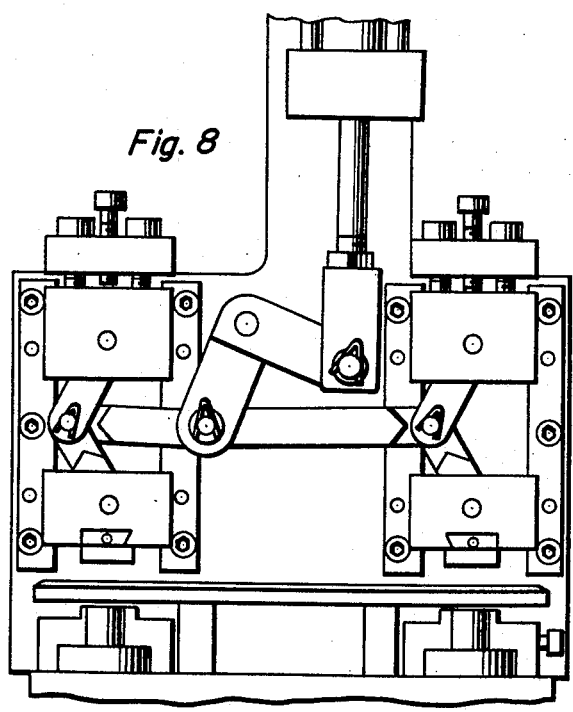
FIGURE 8 is a partial front elevational view of the machine in a still further operative position wth the ram, at an upper end of their strokes.

With reference to FIGURES 7 and 10, it will be observed that when the piston 158 is at the upper end of its stroke, both ram members 42 and 44 will be in their upper or retracted position. The piston 158 may then be displaced to a central position as indicated in FIGURES 11 and 1, wherein both ram members 42 and 44 will be in their engaged or lower end position. When the piston is then displaced to its lowermost position, the ram members 42 and 44 will again be retracted to their upper position as indicated in FIGURES 12 and 8. On the return stroke of the piston, the ram members 42 and 44 will again undergo a full stroke. Accordingly, each stroke of the power operated piston and cylinder device produces two strokes of both ram members 42 and 44 simultaneously. The sheet cutting machine of the present invention will thereby be rapidly operative. It will also be appreciated that the pivotal mounting of the power cylinder device 22 by the swivel pin 144 permits the linkage arrangement 36 to perform properly. The operation of the piston within the power cylinder 22 may therefore be synchronized in accordance with the other operations of the plastic bag forming apparatus, control over the power cylinder being exercised by a solenoid control mechanism 160 and valve assembly 162 mounted on the back upper end of the portion 18 of the back plate member as more clearly seen in FIGURE 2 for supply of pressurized fluid such as air to opposite ends of the power cylinder device 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A machine for cutting spaced holes adjacent an edge of a thin sheet material and forming perforations between each hole and said edge comprising, supporting means having a fixed surface adapted to support said thin sheet of material over an opening therethrough, cutter means mounted below said supporting means and projecting into said opening to present cutting edges disposed slightly below said fixed surface, yieldable engaging means slidably mounted above said supporting means for movement by a limited amount into said opening to press said material into engagement with said cutting edges, means for displacing said yieldable engaging means into pressing engagement with the material, means mounted in said opening adjacent the cutting edges operative in response to withdrawal of the yieldable engaging means from said opening for displacing the material out of contact with said cutting edges, said cutter means including rotatable cutting means having a circular cutting edge for cutting a hole in said material and fixed blade means radially aligned with said rotatable means in closely spaced relation thereto to cut the perforations in the material, said means for displacing the material out of contact with the cutting edges comprising elastically deformable means projecting through said opening to the level of said fixed surface on the supporting means slightly above the cutting edges for contact with the material and deformation therewith when engaged by the yieldable engaging means, said yieldable engaging means comprising ram means reciprocably mounted for movement through a fixed stroke, and presser pad means replaceably mounted on the ram means for displacement of the material into the opening at the end of said fixed stroke of the ram means.

2. The combination of claim 1, wherein said means for displacing said yieldable engaging means comprises toggle means operatively connected to the yieldable engaging means, power operated piston means and linkage means operatively connecting said piston means to the toggle means for imparting two strokes to the yieldable engaging means in response to one stroke of the power operated piston means.

3. In a machine having cutting means for blanking a thin sheet of material and including a pair of material engaging rams for simultaneous engagement of the material at spaced locations thereon, power actuating mechanism for said rams comprising toggle means operatively connected to each of said rams, a single pivotally displaceable power piston device, and linkage means operatively connecting said piston device to each of said toggle means for simultaneously imparting two strokes to each of said pair of rams for one stroke of the piston device, a material supporting member having a fixed surface with openings therein, stroke adjusting means mounting each of said toggle means inadjustably spaced relation to said material supporting member, and said rams being aligned with said openings for movement through strokes terminating slightly beyond said fixed surface of said supporting member to displace the material into engagement with the cutting means.

4. In a machine for cutting relatively thin sheets of flexible material, material supporting means having a fixed surface with at least one opening over which the material is supported, ram means movably mounted in spaced relation to the fixed surface having a material engaging portion aligned with said opening, drive means operatively connected to said ram means for movement of the material engaging portion through a stroke terminating slightly beyond said fixed surface into the opening, elastically deformable means mounted in the opening for clamping the material against the material engaging portion when approaching termination of said stroke within the opening and cutting means projecting into said opening and terminating in cutting edges closely spaced from said fixed surface for engagement with the material when clamped to the material engaging means, said cutting edges including moving portions closely spaced from the elastically deformable means within the opening to accommodate cutting movement thereof.

5. In a machine having cutter means for cutting a thin sheet of material adjacent an edge thereof, material engaging means comprising, ram means reciprocably mounted for movement through a fixed stroke, presser pad means mounted on the ram means for engagement with the material adjacent the end of said fixed stroke of the ram means, supporting means having a fixed surface adapted to support said material over an opening into which the material is pressed by said presser pad means for cutting by the cutter means, an elastically deformable means mounted by the supporting means in said opening for clamping the material over the opening when pressed by the presser pad means.

6. The combination of claim 5 including toggle means operatively connected to the material engaging means, and linkage means operatively connecting a piston to the toggle means for imparting two strokes to the yieldable engaging means in response to one stroke of the piston.

7. The combination of claim 5, wherein said cutter means includes rotatable cutting means having a circular cutting edge for cutting a hole in said material and fixed blade means radially aligned with said rotatable cutting means in closely spaced relation thereto to cut perforations in the material.

References Cited by the Examiner

UNITED STATES PATENTS

| | | | |
|---|---|---|---|
| 796,906 | 8/05 | Gardner | 83—145 |
| 1,650,314 | 11/27 | Ackermann | 83—139 |
| 1,749,545 | 3/30 | Pierce. | |
| 2,738,748 | 3/56 | Hecht | 74—110 |
| 3,066,554 | 12/62 | Hanson | 83—698 |

OTHER REFERENCES

Machinery, "Ingenious Mechanisms"; Kasper; vol. 66, No. 7, pp. 141, 142, March 1960. (Copy in 74–110.)

ANDREW R. JUHASZ, *Primary Examiner.*

HUNTER C. BOURNE, LEON PEAR, *Examiners.*